Nov. 10, 1936.   E. C. STEWART   2,060,475
APPARATUS FOR FEEDING MOLTEN GLASS
Filed June 15, 1934
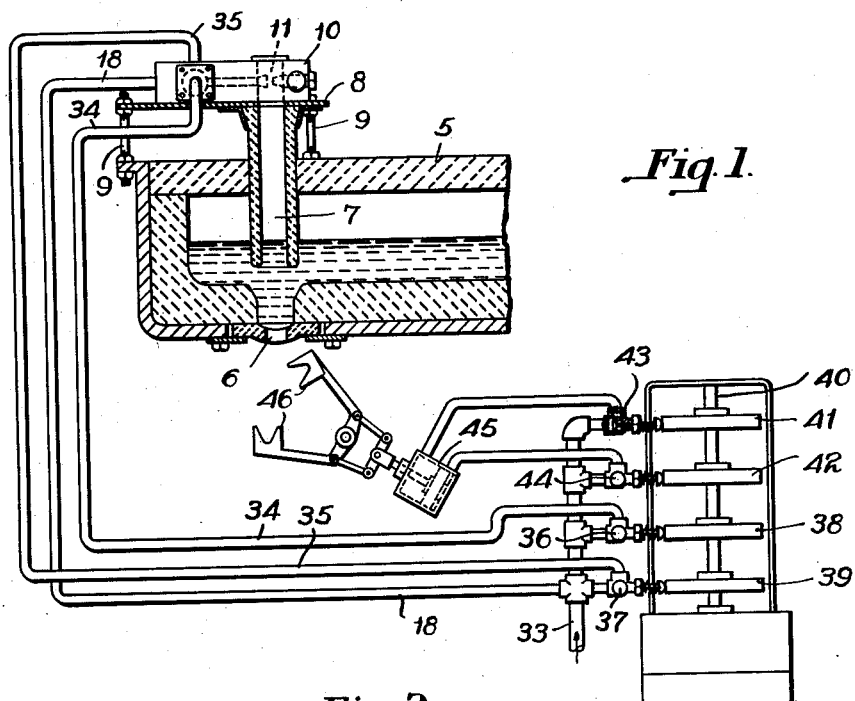
Fig. 1.
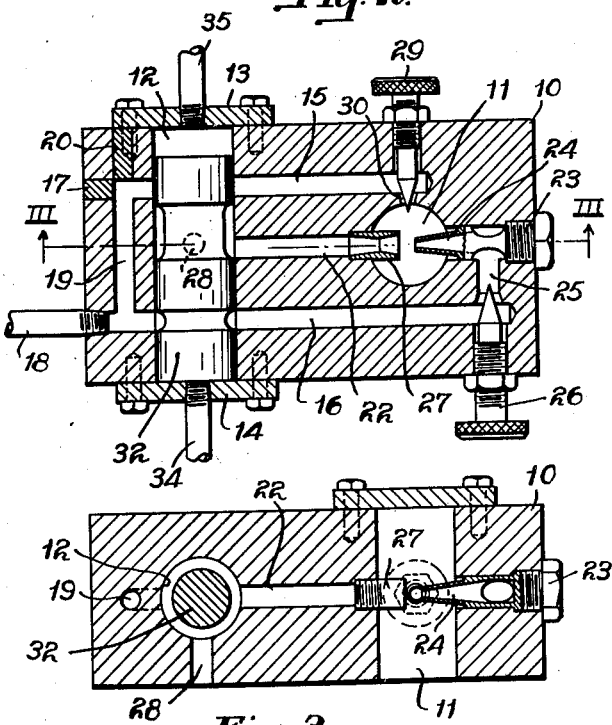
Fig. 2.
Fig. 3.
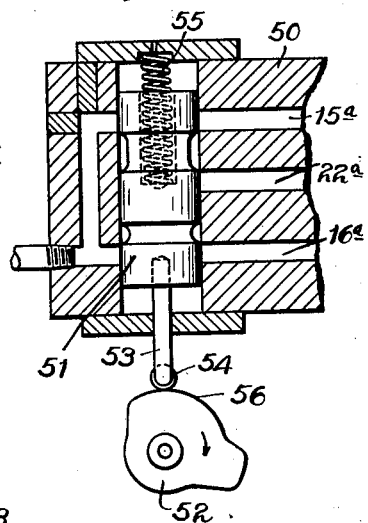
Fig. 4.
INVENTOR
Edward C. Stewart,
By Archworth Martin,
Attorney.

Patented Nov. 10, 1936

2,060,475

UNITED STATES PATENT OFFICE 2,060,475

APPARATUS FOR FEEDING MOLTEN GLASS

Edward C. Stewart, Washington, Pa., assignor, by mesne assignments, to Hartford-Empire Company, Hartford, Conn., a corporation of Delaware Application June 15, 1934, Serial No. 730,736

5 Claims. (Cl. 49—55)

My invention relates to a glass feeding method and apparatus for supplying charges of molten glass to glass-forming machines, and particularly to that type of feeding apparatus designated as air feeders.

My application Serial No. 666,687, filed April 18, 1933 which has become Patent 2,010,334, discloses a feeder wherein no pressure and suction are employed. In the apparatus of said application, the glass is delivered from an orifice in the bottom of a glass furnace boot, in the form of a continuous stream which is periodically sheared to produce the mold charges. The said form of apparatus operates very satisfactorily where the forming machine can be operated rapidly enough to receive the mold charges as fast as they are formed. Some machines cannot be operated so rapidly, this being true of many machines of the older type. Again, in the forming of larger sizes of ware, the machines cannot be moved so rapidly as in the forming of small ware.

The present application is directed to the forming of mold charges of shapes similar to those formed by the free-flowing stream method of my previous application referred to, it being optional with the user whether the stream is sheared before necking, or drawing in of the glass occurs, or whether the shearing operation be delayed until slight necking occurs. In any case, the present application does not contemplate the application of such pressure as will produce swelling of the charge or prevent necking thereof.

An object of the present invention is to provide a simplified and improved manner for periodically retarding the flow of the glass from the feeding orifice, and to effect resumption of said flow without substantial or prolonged application of pressure to the glass above the orifice.

Some forms of apparatus for practicing my invention are shown in the accompanying drawing wherein Figure 1 is a schematic view of the feeding mechanism, partially in section; Fig. 2 is a sectional plan view, on an enlarged scale, of a portion of the control valve mechanism of Fig. 1; Fig. 3 is a view taken on the line III—III of Fig. 2, and Fig. 4 is a view showing a modification of the structure of Fig. 2.

Referring first to Figs. 1 to 3, I show a glass furnace boot or forehearth 5 that may communicate with the usual glass-melting tank. The boot is provided with an orifice ring or bushing 6 which is detachably secured in place and can be readily replaced with bushings having orifices of other sizes. A bell 7 is mounted above the orifice, and is connected to a plate 8 that is mounted on supporting bolts 9. A valve block 10 is mounted upon the plate 8 and has an opening 11, that communicates with the interior of the bell.

A chamber 12 is formed in the block by drilling a hole of suitable diameter therethrough, the ends of said holes being covered by plates 13 and 14. Passages 15 and 16 are formed in the block by drilling into the left hand end thereof, the outer end of the passageway 15 being closed by a plug 17, and the outer end of the passage 16 being threaded for connection to an air supply pipe 18. A transverse passage 19 is formed by drilling into the upper end of the block, as viewed in Fig. 2, the exposed end of the passage being closed by a plug 20. The passage 19 affords communication between the passages 15 and 16.

The block is drilled from its rear end to form a central passageway 22, the outer end of this drilled opening being threaded for the reception of a screw 23 that carries a nozzle 24. The nozzle 24 has communication with a port 25 that is formed by drilling into the lower side of the block and communicates with the passage 16. The drilled outer end of the port 25 is threaded to receive a valve 26, whose inner end is tapered and controls flow through the port 25.

The nozzle 24 discharges across the opening 11 into a Venturi tube 27 that has threaded connection with the wall of the passageway 22, and discharges through a port 28, when the control valve hereinafter described is in a given position, thereby creating suction within the bell 7.

The block 10 is bored for the reception of a needle valve 29, and to provide a valve seat 30, the valve 29 controlling flow from the passage 15 to the opening 11. A control valve or piston 32 is slidably mounted in the valve chamber 12, and at its various positions controls flow through the various passages 15, 16, and 22.

Air pressure is constantly supplied to the passage 19 through the pipe 18 from a pressure line 33. When the control valve 32 is in the position shown in Fig. 2, air will be discharged past said valve through the passageway 16, past valve 26 and nozzle 24 to the Venturi tube 27, and be exhausted through the port 28, to thereby produce suctional force or partial vacuum within the bell 7, and retard flow of glass through the orifice at 6.

The adjustment of the valve 26 may be such that the suctional force will be sufficient to actually draw the end of the glass stream up into the orifice, or it may be sufficient only to check the flow of glass. Where the temperature of the glass or the rate of feeding is so slow as to result in chilling of the lower end of the glass stream, the suctional force will be made great enough to draw the chilled end of the glass into the orifice and the surrounding glass, to effect reheating of said end.

With the valve 32 at its other extreme position, the passageways 16 and 22 will be closed, and communication established from pipe 18 through passageways 19 and 15 to the opening 11, thereby admitting compressed air into the bell 7. The valve 29 controls the rate of flow to the bell.

Shifting of the control valve 32 is effected by pressure through pipes 34 and 35, it being apparent that when pressure is supplied through pipe 35, the valve will be moved to the position shown in Fig. 2, and will be shifted to its opposite position by pressure admitted through the pipe 34. Pressure is supplied to the pipes 34 and 35 past valves 36 and 37, respectively, that are controlled by cams 38 and 39, which periodically open said valves in succession against pressure of springs which normally tend to hold the valves closed. The cams are secured to a shaft 40 that is driven in any suitable manner.

Cams 41 and 42 are also mounted on the shaft 40, and periodically open valves 43 and 44 in succession, to admit pressure to the opposite sides of a piston contained within a cylinder 45, that operates a shear 46, to periodically shear mold charges from a stream of glass descending from the orifice 6. The cams 39 and 42 are so adjusted relative to one another that the valve 37 will be operated slightly in advance of the valve 44, to thereby create suction and retardation of glass flow slightly in advance of the closing of the shears. The cam 42 maintains the valve 44 open for only a very short period of time, the valve thereafter being closed under spring pressure, and the cam 41 opening the valve 43 to effect opening movement of the shear blades. The valves 36, 37, 43, and 44 are all provided with exhaust openings of any suitable form which, when the valves are closed, will permit of exhaust from the pipes to which said valves respectively lead.

The duration of suction within the bell is, of course, determined by the period of time which the control valve 32 is permitted to remain in the position shown in Fig. 2. The cam 38 serves to open the valve 36 to admit pressure to pipe 34 and cause movement of the control valve 32 to its opposite position, thereby admitting pressure from the pipe 18 to the bell 7, as heretofore explained. The needle valve 29 is so adjusted that the amount of air flowing past the same will be much smaller than the amount of air which is admitted past the needle valve 26, since it is desired to admit only a very limited quantity of air to the bell.

The small quantity of air which enters the bell 7 will become heated quickly and expand to such degree that the effect of the suction theretofore created therein will be overcome, and a slight impulse applied to the glass in the bell to start downward movement of the glass. After initial expansion of the air admitted to the bell, the continued flow thereto past the valve 29 will be only sufficient to replace the glass which flows from the bell. Owing to the partial vacuum existing in the bell at the time the valve 37 is operated, the inflow past the valve 29 will at first be quite rapid, and the flow of air to the bell will gradually decrease in rate as the vacuum condition within the bell is overcome.

The sizes of the charges can be controlled by suitable adjustments of the valves 26 and 29. Thus, if the valve 26 be so set that the glass is drawn well up into the orifice, the amount of glass which is issued at the orifice at the next operation of the shear will not be so great as would be the case if less suctional force were applied. Again, the rate of feeding movement of the glass can be readily controlled by the adjustment of the valve 29, since the rate of such movement will be dependent upon the quantity of air admitted past such valve.

As heretofore explained, feeding flow of the glass is principally under only the force of gravity, and I am therefore able to better control the size and shape of the mold charges than if propulsive force were applied to the glass. In the operation of feeders made according to the present invention, as well as the type of feeders shown in my previous application above referred to, I have found that full-size mold charges of substantially cylindrical contour throughout their lengths can be readily formed without the employment of any propulsive force on the glass, and that said mold charges are of more uniform size and weight than where feeding pressure is applied to the glass.

In those cases where the molten glass is somewhat stiff, or the sheared lower end of the stream becomes chilled, and suctional force will be such that the sheared end will be drawn entirely into the orifice, whereupon the expulsive force exerted on the glass above the orifice will cause swelling of the said sheared end within the orifice, to effect shaping thereof, and to eliminate the chilled shear mark.

Referring now to Fig. 4, I show a valve block 50 having a control valve 51 and ports and passages identical with those shown in the valve block of Fig. 2. In the present case, however, I employ a cam 52 for operating the valve 51, instead of the pressure lines 34 and 35 of Fig. 1. The valve 51 carries a stem 53 which has a roller 54, and is held in contact with the cam 52 by a spring 55. The rotation of the cam effects shifting of the valve 51 to create pressure and suction conditions alternately within the bell.

In order to insure that during the latter portion of the flowing movement of the glass it will be free of pressure, it is desirable to close the pressure conduit 15a for a substantial period of time in advance of the initiation of the suctional impulse. To this end, I provide the cam 52 with a dwell portion 56 that will maintain the valve 51 at the position shown in Fig. 4, with all the passages 15a, 16a, and 22a closed.

In Fig. 2, the valve 32 shifts quickly from one extreme position to another so that there is but a short time interval between a pressure condition and a suction condition within the bell, although the valve 26 may be set so close to its seat that an appreciable period of time is required to exhaust the excess air in the bell and to create a suction condition therein.

It will be understood, of course, that molten glass from the boot will enter the bell 7, and that the glass level within the bell will rise and fall in accordance with the changes in pressure within the bell.

I claim as my invention:—

1. The combination with a receptacle for molten glass having a discharge orifice in its bottom, of an air confining enclosure above said orifice and closed at its lower end by the glass, a Venturi device for creating suction within the enclosure, a conduit leading to the Venturi device, a conduit by-passing said Venturi device and leading to the said enclosure, an exhaust port leading from the venturi, a compressed air line, a valve controlling flow from said line to the said conduits and port, and so arranged that in one position it will permit flow of compressed air from the line to the venturi and the said port, and in another position will cut off said flow and close the exhaust port, while establishing communication between said line and the by-pass conduit, and means for periodically operating said valve.

2. The combination with a receptacle for molten glass having a discharge orifice in its bottom, of an air-confining enclosure above said orifice and closed at its lower end by the glass, a Venturi device for creating suction within the enclosure, a conduit leading to the Venturi device, a conduit by-passing said Venturi device and leading to the said enclosure, an exhaust port leading from the venturi, a compressed air line, a valve controlling flow from said line to the said conduits and port, and so arranged that in one position it will permit flow of compressed air from the line to the venturi and the said port and in another position will cut off said flow and close the exhaust port, while establishing communication between said line and the by-pass conduit, means for periodically operating said valve, and means independent of said valve for regulating the rate of flow through said conduits.

3. The combination with a receptacle for molten glass having a discharge orifice in its bottom, of an air-confining enclosure above said orifice and closed at its lower end by the glass, a Venturi device for creating suction within the enclosure, a conduit leading to the Venturi device, a conduit by-passing said Venturi device and leading to the said enclosure, an exhaust port leading from the venturi, a compressed air line, a valve controlling flow from said line to the said conduits and port, and so arranged that in one position it will permit flow of compressed air from the line to the venturi and the said port, and in another position will cut off said flow and close the exhaust port, while establishing communication between said line and the by-pass conduit, means for periodically operating said valve, and means independent of said valve for regulating the rate of flow through the Venturi conduit.

4. The combination with a receptacle for molten glass having a discharge orifice in its bottom, of an air-confining enclosure above said orifice and closed at its lower end by the glass, a Venturi device for creating suction within the enclosure, a conduit leading to the Venturi device, a conduit by-passing said Venturi device and leading to the said enclosure, an exhaust port leading from the venturi, a compressed air line, a valve controlling flow from said line to the said conduits and port, and so arranged that in one position it will permit flow of compressed air from the line to the venturi and the said port, and in another position will cut off said flow and close the exhaust port, while establishing communication between said line and the by-pass conduit, and means for periodically operating said valve, the said means serving to hold the valve longer in the position for producing suction than in the position for pressure.

5. The combination with a receptacle for molten glass having a discharge orifice in its bottom, of an air-confining enclosure above said orifice and closed at its lower end by the glass, a Venturi device for creating suction within the enclosure, a conduit leading to the Venturi device, a conduit by-passing said Venturi device and leading to said enclosure, an exhaust port leading from the venturi, a compressed air line, a reciprocable valve controlling flow from said line to the said conduits and port, and so arranged that in one position it will permit flow of compressed air from the line to the venturi and the said port, and in another position will cut off said flow and close the exhaust port, while establishing communication between said line and the by-pass conduit, and means for effecting movement of the valve more quickly in one direction than in the other.

EDWARD C. STEWART.